Dec. 4, 1962    J. R. OISHEI ETAL    3,066,543
WINDSHIELD WIPER SYSTEM
Filed Dec. 16, 1959

INVENTOR.
JOHN R. OISHEI and
BY ERWIN C. HORTON

Bean Brooks Buckley & Bean.
ATTORNEY

United States Patent Office 3,066,543
Patented Dec. 4, 1962

3,066,543
WINDSHIELD WIPER SYSTEM
John R. Oishei, Buffalo, and Erwin C. Horton, Hamburg, N.Y., assignors to Trico Products Corporation, Buffalo, N.Y.
Filed Dec. 16, 1959, Ser. No. 859,942
3 Claims. (Cl. 74—95)

The present invention relates to a windshield wiper system and more particularly to an improved drive linkage therefor.

It is an object of the present invention to provide an improved drive linkage which combines the advantages of a rigid link drive and a cable drive in an efficient manner in order to produce smooth, quiet operation with a minimum of wear between operating parts of the linkage, as well as produce high torque at the ends of the wipe pattern.

It is another object of the present invention to provide an improved combined rigid link and flexible cable windshield wiper drive linkage wherein the wiper arms may be located on the cowl of the vehicle in a position which will provide an optimum drive pattern, irrespective of the locations of the remaining components of the drive linkage.

It is a further object of the present invention to provide an improved combined rigid link and cable drive which has relatively little friction between operating parts thereby permitting the wiper motor to operate under lower loads. Other objects and attendant advantages of the present invention will readily be perceived hereafter.

In the wiper system of the present invention, each rockshaft which mounts a wiper arm has a pulley rigidly attached thereto, and a driven flexible cable is wound around each pulley. This broad combination is well known for the purpose of providing a high torque at the ends of wiper blade travel. In accordance with the present invention, the ends of each flexible cable are anchored to a rigid carriage which is guided for reciprocation in a fixed path in a frame rigidly affixed relative to the housing in which the rockshaft oscillates. The path of reciprocation of the carriage is in a plane which is substantially perpendicular to the axis of the rockshaft, this plane also containing the above-noted pulley. A wiper motor is provided, and the output shaft thereof has a crankarm element attached thereto for reciprocating a rigid elongated link extending toward each rockshaft. It will readily be appreciated that with modern curved windshields, when the rockshafts which mount the wiper arms are in a position which will provide an optimum wipe pattern, the planes in which the pulleys lie and the carriages reciprocate are not the same plane as the plane in which the crankarms on the motor oscillate. A ball joint connection is therefore provided between each carriage and each of the elongated links extending from the wiper motor to transmit the motion from the crankarms to the carriages in an efficient manner. Since the above-described linkage permits each carriage to be guided for reciprocation in a plane which is perpendicular to the axis of its respective rockshaft, there is no lateral thrusting force between each cable and its associated pulley, thereby not only tending to minimize the wear between these members but also tending to eliminate the additional load which may be imposed on the wiper motor because of the additional friction incidental to the end thrust. Furthermore, since the carriages are guided in the above-noted perpendicular paths, the rockshafts can be positioned at any desired location on the cowl of the vehicle to provide an optimum wipe pattern, without concern with the location of the remainder of the components of the drive linkage. In their optimum position, the axes of the rockshafts are not parallel to the axis of the wiper motor drive shaft. The present invention will be more fully understood when the following portions of the specification are read in conjunction with the accompanying drawings wherein:

Figure 1:
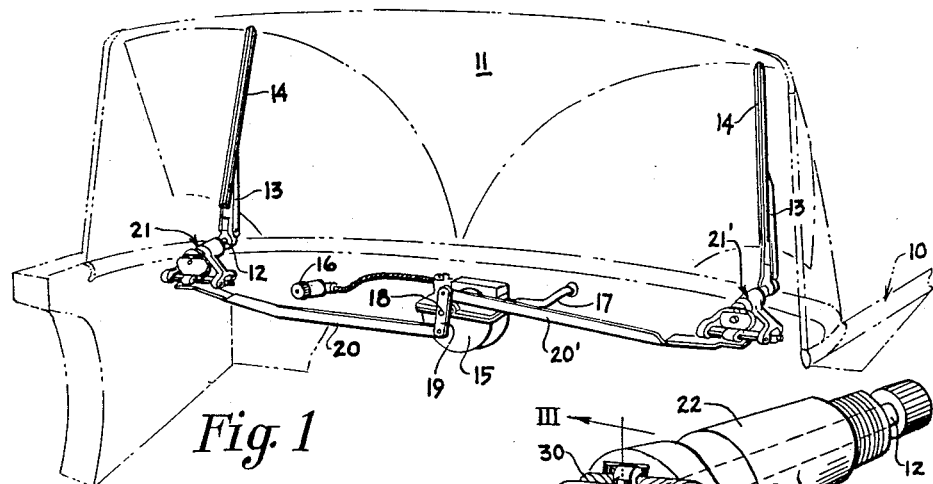
FIG. 1 is a fragmentary perspective view of an automotive vehicle mounting the improved drive linkage of the present invention.
Figure 2:
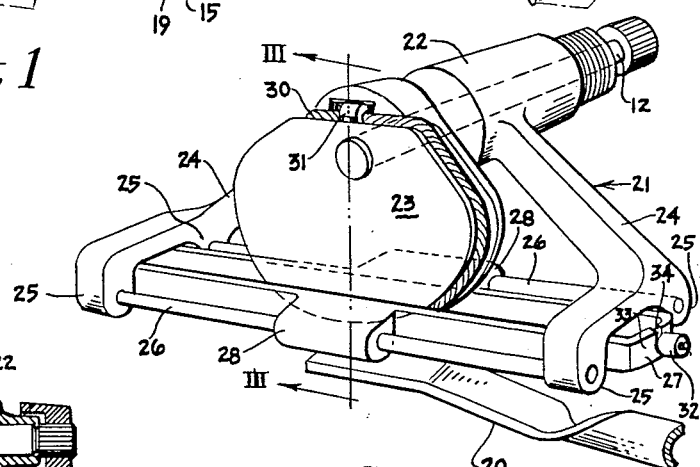
FIG. 2 is an enlarged perspective view of a portion of the improved drive linkage.
Figure 3:
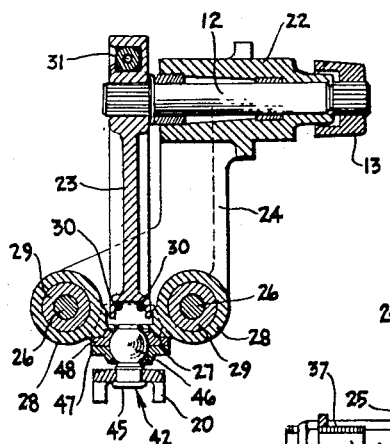
FIG. 3 is a view taken along line III—III of FIG. 2.
Figure 4:
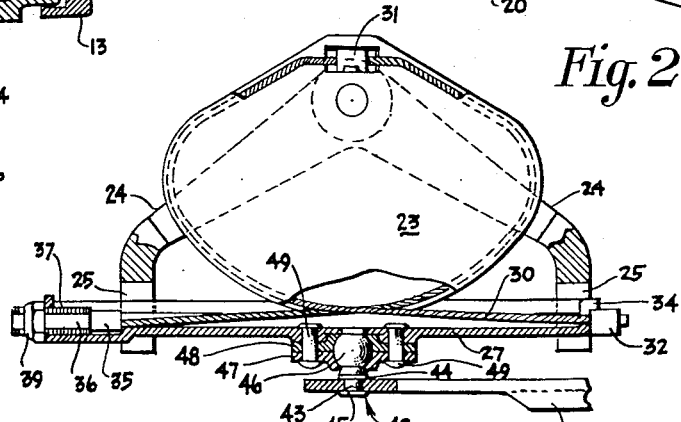
FIG. 4 is a view of a portion of the improved drive linkage with certain parts broken away in the interest of clarity.

In FIG. 1 automotive vehicle 10 has windshield 11 mounted thereon in the conventional manner. Mounted on the outer ends of rockshafts 12 are wiper arms 13 which, in turn, mount wiper blades 14. As is well understood in the art, whenever wiper motor 15 is in operation, wiper blades 14 oscillate back and forth to clear moisture from the windshield.

In order to place wiper motor 15 in operation, control 16 is actuated to permit the engine intake manifold to communicate with the working parts of the wiper motor through conduit 17. The output shaft 18 of motor 15 has crankarm link 19 rigidly affixed thereto. One end of crankarm 19 has elongated link 20 pivotally affixed thereto and the other end thereof has elongated link 20' pivotally affixed thereto. The pivotal connections may comprise pins or ball joints, as the requirements of the particular installation dictate. The oscillatory motion of crankarm link 19 is converted into a generally reciprocatory motion by elongated links 20 and 20'. The ends of links 20 and 20', remote from link 19, are attached to intermediate linkage units 21 and 21' respectively, to drive the windshield wipers.

Intermediate linkage 21 will now be described, it being understood that linkage 21' is of identical construction. Linkage 21 includes a housing 22 in which rockshaft 12 is journalled. The inner end of rockshaft 12 has a pulley member 23 rigidly secured thereto, as by a press fit. Depending from housing 22 are legs 24 which are forked at the ends thereof at 25. Extending in a direction substantially perpendicular to the axis of rockshaft 12 are guide rods 26 which are rigidly secured in forked ends 25. Guides 26 define the path which carriage 27 takes when it is reciprocated by elongated link 20. More specifically, carriage 27 includes collars 28 having bearings 29 therein which engage guide rods 26.

Figure 5:
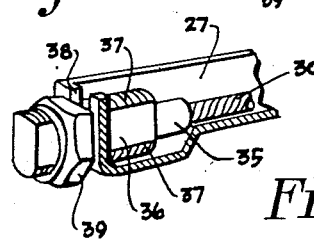
FIG. 5 is a detail view showing the manner in which one portion of the flexible cable is connected to the remainder of the linkage.

A flexible cable 30 encircles pulley 23 and is staked thereto at its center by stake 31. One end of flexible cable 30 has lug 32 affixed thereto. Lug 32 abuts the outer end 33 of carriage 27, the adjacent portion of cable 30 fitting within slot 34. The other end of cable 30 is rigidly held by lug 35, as by a swaged connection (FIG. 5). Formed integrally with lug 35 is stem 36 having threads 37 thereon. The side faces of stem 36 are planar so as to permit stem 36 to lie within slot 38 formed in the end of carriage 27 without turning. A nut 39 is adapted to be threaded onto the outer end of stem 36. In order to adjust the tension of cable 30, it is merely necessary to turn nut 39 to cause stem 36 to move in an axial direction through slot 38.

In accordance with the present invention, a ball joint 42 is interposed between carriage 27 and link 20. Ball joint 42 consists of a stem 43 having shoulder 44 thereon and peened portion 45 on the outer end thereof so as to rigidly secure ball joint 42 to elongated link 20. Ball joint 42 also includes a ball member 46 integral with stem 43. Ball 46 fits within a mating aperture formed by plates 47 and 48 which are rigidly secured to the underside of carriage 27 by rivets 49.

It can readily be seen that the guide rods 26 guide the carriage 27 in a path which is substantially perpendicular to the axis of the rockshaft 12 regardless of the angle between elongated link 20 and carriage 27. The fact that this substantially perpendicular relationship is maintained prevents the existence of an endwise thrust exerted on the pulley 23 by cable 30, which end thrust would normally occur if carriage 27 were not guided in the above-noted path. The elimination of the endwise thrust tends to minimize the wear between the cable 30 and the pulley 23. Furthermore, the elimination of this endwise thrust also tends to eliminate friction between the elements mounted on the rockshaft and the ends of housing 22, thereby insuring smoother operation of the wiper motor at lower loads. Because carriages 27 are guided in a path perpendicular to the axis of the shaft of motor 15, the axes of the rockshafts need not be parallel to the axis of motor drive shaft 18, and the rockshafts can therefore be positioned wherever they will give optimum wipe patterns, without regard to the positioning of the remaining parts of the linkage. The foregoing advantages exist in addition to the advantage of applying the turning force to rockshaft 12 through pulley 23, which provides a lever arm of substantially constant length throughout the wiper stroke, which, in turn, produces a high torque at the ends of the wiper stroke.

While a preferred embodiment of the present invention has been disclosed, it is to be understood that it is not to be limited thereto, but may be otherwise embodied within the scope of the following claims.

What is claimed is:

1. A windshield wiper linkage comprising a housing, a rockshaft journalled for oscillation in said housing, a pulley member rigidly secured to said rockshaft, an elongated link adapted to transmit a substantially reciprocatory motion, a carriage mounted on said housing for strictly rectilinear movement with respect to said rockshaft flexible cable means coupled between said pulley and said carriage, and a swivel connection between said elongated link means and said carriage.

2. A windshield wiper linkage comprising a housing, a rockshaft journalled for oscillation in said housing, a pulley member rigidly secured to said rockshaft, an elongated link adapted to transmit a substantially reciprocatory motion, a carriage mounted on said housing, means for guiding said carriage in a strictly rectilinear path which lies substantially perpendicular to the direction of the axis of said rockshaft, flexible cable means coupled between said pulley and said carriage, and a swivel connection between said elongated link means and said carriage to permit a change in orientation between said elongated link means and said carriage without an accompnying change in the substantial perpendicular relationship between said carriage and the axis of said rockshaft.

3. A windshield wiper linkage comprising a housing, a rockshaft journalled for rotation in said housing, a pulley mounted on said rockshaft and lying generally in a plane which is substantially perpendicular to the axis of said rockshaft, a carriage slidably mounted for pure reciprocatory movement on said housing in a direction which is substantially perpendicular to the axis of said rockshaft and which is also substantially parallel to the plane of said pulley, link means coupled to said carriage for imparting reciprocatory movement to said carriage, cable means encircling said pulley and affixed to said carriage for driving both said pulley and said rockshaft in response to the reciprocation of said carriage by said link means, said joint mounting of both said rockshaft and said carriage on said housing tending to obviate excessive motion between said carriage and said rockshaft to thereby transmit motion from said link to said rockshaft with relatively little play therebetween.

References Cited in the file of this patent

UNITED STATES PATENTS

| 987,909 | Peirce | Mar. 28, 1911 |
| 2,252,350 | Paulus | Aug. 12, 1941 |
| 2,521,983 | Kyle | Sept. 12, 1950 |
| 2,901,764 | Anderson | Sept. 1, 1959 |
| 2,947,185 | Ziegler | Aug. 2, 1960 |

FOREIGN PATENTS

| 678,333 | France | Dec. 23, 1929 |

UNITED STATES PATENT OFFICE
CERTIFICATE OF CORRECTION

Patent No. 3,066,543                      December 4, 1962

John R. Oishei et al.

It is hereby certified that error appears in the above numbered patent requiring correction and that the said Letters Patent should read as corrected below.

Column 3, line 39, after "rockshaft" insert a comma; column 4, line 11, for "accompnying" read -- accompanying --.

Signed and sealed this 14th day of May 1963.

(SEAL)
Attest:

ERNEST W. SWIDER                      DAVID L. LADD
Attesting Officer                     Commissioner of Patents